United States Patent Office 3,016,376
Patented Jan. 9, 1962

3,016,376
PROCESS OF SEPARATING EPSILON-CAPROLACTAM
William C. Francis, Overland Park, Kans., assignor to Spencer Chemical Company, Kansas City, Mo., a corporation of Missouri
No Drawing. Filed July 13, 1959, Ser. No. 826,485
8 Claims. (Cl. 260—239.3)

This invention relates to the production of epsilon-caprolactam. More particularly, this invention is concerned with novel processes of producing epsilon-caprolactam and separating this product from Beckmann rearrangement mixtures containing the same.

The Beckmann rearrangement of cyclohexanone oxime can be effected with catalysts such as concentrated sulfuric acid, oleum, ammonium bisulfate and urea bisulfate. The resulting rearrangement mixture contains epsilon-caprolactam more or less strongly bound as a salt of the acidic catalyst. In order to permit isolation of the free lactam, such mixtures are usually neutralized with aqueous bases followed by extraction with solvents such as chloroform or benzene. Such procedures of separating epsilon-caprolactam are not entirely satisfactory and suffer the disadvantage either of requiring complicated and inefficient means of recovering the catalyst, or more often of resulting in the conversion of catalyst to large quantities of undesirable by-products such as sodium or ammonium sulfate. Further, the method of isolating epsilon-caprolactam by solvent extraction of such neutralized rearrangement mixtures generally results in co-extraction of reaction impurities which must then be removed by various extraction or ion exchange techniques, oxidative treatments, distillation or combinations of such procedures.

According to the present invention, it has been found that Beckmann rearrangement reaction mixtures of cyclohexanone oxime containing epsilon-caprolactam and certain of the rearrangement catalysts and, particularly, polyphosphoric acid, ammonium bisulfate and urea bisulfate, can be subjected to increased temperatures under reduced pressure to effect distillation, and thus separation, of the epsilon-caprolactam without neutralization of the rearrangement catalyst.

The process of this invention permits the isolation of epsilon-caprolactam in such a manner as to permit recycle and maximum utilization of the rearrangement catalyst. The epsilon-caprolactam is isolated as a crystalline distillate which requires little or no further purification of the product. There is advisably no dilution of the rearrangement mixture before, during, or after the separation of the lactam therefrom.

Concentrated sulfuric acid and oleum form salts with epsilon-caprolactam which prevent isolation of the lactam by direct distillation from rearrangement mixtures containing these catalysts. However, in the case of use of such strong acids, the direct distillation of product can be effected after neutralization or partial neutralization with anhydrous bases such as ammonia or organic amines.

Distillation of epsilon-caprolactam from the rearrangement mixtures is conveniently effected at a temperature below 175° C. to prevent decomposition of the lactam. To achieve distillation at a temperature below 175° C., reduced pressure, i.e., a pressure such as of less than about 20 mm. of mercury, must be employed. In general, however, a temperature below 160° C. and a pressure no greater than 10 mm., are advisably employed.

It is sometimes desirable during the Beckmann rearrangement to include a solvent or dispersant, such as 1,2-dichloroethane, in the oxime-catalyst mixture to lower the viscosity of the mixture and also control the reaction temperature as by employing a solvent having a boiling point in the range of the reaction temperature. Such solvents or dispersants are removed, as by distillation, before the lactam is separated from the catalyst.

The use of ammonium bisulfate to rearrange cyclohexanone oxime is disclosed in United States Patent No. 2,723,266 issued November 8, 1955. Horning et al. in the J. Am. Chem. Soc. 74, 2680 (1952) describe the rearrangement of various oximes with polyphosphoric acid. Also, in United States patent application Serial No. 765,067, filed October 3, 1958, the rearrangement of cyclohexanone oxime with urea bisulfate as the catalyst is shown.

The separation of epsilon-caprolactam by the distillation procedure of this invention is preferably not carried to exhaustion at each step. Rather, a residual amount of organic product is left in the acid catalyst which is recycled through the subsequent rearrangement of a fresh charge of oxime. Dependent upon the particular catalyst system used, the initial purity of the catalyst, the extent to which each distillation is carried, and the temperature and pressure used for the distillation, a certain amount of impurities will accumulate in the catalyst. Thus, as will be obvious to those skilled in the art, the reuse of the catalyst may reach certain practical limits, at which point it would be advantageous to neutralize the mixture to isolate the residual amount of product by conventional procedure. A fresh charge of catalyst would then be used to re-initiate the recycle operation. However, a heel of caprolactam can be kept in the recycled catalyst and be present during the rearrangement.

The epsilon-caprolactam is generally obtained from the distillation as a crystalline solid. The purity of this product will be to some extent governed by the efficiency of rectification used during the distillation and by the extent to which the removal of product is carried after each recycle, as well as by the various other factors discussed above.

The following examples are presented to illustrate the invention.

EXAMPLE 1

Twenty grams of polyphosphoric acid was heated with stirring to 90° C., and an equal weight of epsilon-caprolactam was added while maintaining this temperature. Stirring and heating were continued until the mixture appeared to be completely homogeneous. The solution was then heated to 140°–150° C. under a pressure of 2 mm. while maintaining a slow flow of nitrogen through the system. Caprolactam distilled over and the temperature was slowly raised to 170° C. The total amount of caprolactam collected was 11.05 g. (55.3%) M.P. 72°–75° C.

To the crude polyphosphoric acid residue was added 11.1 g. of cyclohexanone oxime in 24 ml. of 1,2-dichloroethane while stirring and maintaining a temperature of about 85° C. After addition of the oxime solution was completed, the reaction mixture was stirred at 85°–90° C. for an additional 30 minutes. The solvent was then removed by distillation under reduced pressure.

The residue remaining after removal of the solvent was heated under nitrogen atmosphere and a pressure of 5 mm. at a temperature of 140°–170° C. The caprolactam was collected as crystalline distillate in a receiver at room temperature. Heating was continued until no further product was collected. The remaining residue was used for another rearrangement of oxime in 1,2-dichloroethane by the method just described. This procedure was repeated for three cycles, using an amount of oxime each time equivalent to the amount of lactam isolated from the preceding run. The results are shown in Table 1.

Table 1

| Grams of Oxime Charged | YIELD OF CAPROLACTAM | | | |
|---|---|---|---|---|
| | Grams | M.P. (° C.) | Percent | Cumulative Yield (Percent) |
| 20.0 a | 11.05 | 72–75 | 55.2 | |
| 11.1 | 7.15 | 69–73 | 64.5 | 64.5 |
| 7.2 | 6.8 | 69–76 | 94.5 | 76.2 |
| 6.8 | 5.55 | 68–73 | 81.6 | 77.8 | a Initial charge was 20 g. of caprolactam, rather than cyclohexanone oxime.

EXAMPLE 2

A solution of 20 g. of cyclohexanone oxime in 24 ml. of hot 1,2-dichloroethane was added slowly to 20 g. of polyphosphoric acid dispersed in 40 ml. of 1,2-dichloroethane while heating and stirring at 85° C. Stirring was continued at this temperature for an additional 30 minutes after all the oxime had been added. The dichloroethane dispersant was removed by distillation under reduced pressure. The residue was then heated to 140° C. at a pressure of about 3–5 mm. while maintaining a slow flow of nitrogen through the system. Caprolactam was collected as distillate through a temperature range of 140°–170° C. The total amount of caprolactam which was recovered was 7.6 g. (38%) M.P. 68°–70° C.

EXAMPLE 3

A rearrangement of cyclohexanone oxime was carried out by adding a solution of 10 g. of the oxime in 50 ml. of xylene to a stirred slurry of ammonium bisulfate (100 g.) in 100 ml. of xylene. The mixture was heated at reflux (140° C.) for 30 minutes. The solvent was removed by distillation under reduced pressure, and the residue was distilled at 145°–150° C./2–3 mm. to yield 3.0 g. (30%) of caprolactam as crystalline distillate, M.P. 68°–71° C.

The distillation residue was recycled to a second rearrangement reaction using the quantities and procedure described above. Vacuum distillation yielded 57% of caprolactam, M.P. 68°–71° C. When the catalyst residue was recycled to a third rearrangement, a 50% yield of the lactam, M.P. 68°–72° C., was obtained by the distillation procedure.

EXAMPLE 4

A rearrangement was carried out with 35 g. of cyclohexanone oxime in an equal weight of polyphosphoric acid dispersed in 45 ml. of dichloroethane. The reaction mixture was heated at 85° C. for 30 minutes. After removal of solvent, vacuum distillation of the residue gave a total of 10.9 g. (31.2%) of crystalline caprolactam at 140°–160° C./2–5 mm. The residue from this distillation was recycled to a second rearrangement reaction, as described above, using the same charge of cyclohexanone oxime. Vacuum distillation of the reaction residue yielded 16.6 g. (47.5%) of crystalline caprolactam at 140°–160° C./2–3 mm.

EXAMPLE 5

Rearrangement of 8 g. of cyclohexanone oxime in a mixture containing 25 g. each of caprolactam and polyphosphoric acid was carried out at 90° C. in 1,2-dichloroethane. After removal of solvent, the residue was vacuum distilled until 12.1 g. of crystalline caprolactam had been collected at 130°–150° C./1–2 mm. A second rearrangement of 8 g. of oxime was carried out in the polyphosphoric acid residue by the same procedure. The recycle procedure was repeated five times for a total of 40 g. of cyclohexanone oxime. The successive crops of caprolactam were: (1) 12.1 g., M.P. 73°–75° C.; (2) 5.1 g., M.P. 66°–69° C.; (3) 6.6 g., M.P. 69°–72° C.; (4) 6.2 g. (oil)–0.75 g. recrystallized, M.P. 71°–73° C.; (5) 8.8 g. (oil)–50% caprolactam by infrared analysis.

EXAMPLE 6

A mixture of 5 g. (0.044 mole) of caprolactam and 0.088 mole of urea bisulfate was distilled at 110°–155° C. and 2–3 mm. of mercury to yield 4.8 g. (96% recovery) of epsilon-caprolactam as crystalline distillate, M.P. 66°–68° C.

Various changes and modifications of the invention can be made and, to the extent that such variations incorporate the spirit of this invention, they are intended to be included within the scope of the appended claims.

What is claimed is:

1. The process of separating epsilon-caprolactam from a mixture with a Beckmann rearrangement catalyst of the group consisting of polyphosphoric acid, ammonium bisulfate and urea bisulfate, which comprises distilling the mixture of catalyst and epsilon-caprolactam, without neutralization of the catalyst, at a reduced pressure and elevated temperature below 175° C. to directly distill the epsilon-caprolactam.

2. The process of separating epsilon-caprolactam from mixture with polyphosphoric acid which comprises distilling the lactam from said mixture, without neutralization of the polyphosphoric acid, at a temperature below 175° C. and a pressure of below 20 mm. of mercury.

3. The process of separating epsilon-caprolactam from mixture with urea bisulfate which comprises distilling the lactam from said mixture, without neutralization of the urea bisulfate, at a temperature below 175° C. and a pressure of below 20 mm. of mercury.

4. The process of separating epsilon-caprolactam from mixture with ammonium bisulfate which comprises distilling the lactam from said mixture, without neutralization of the ammonium bisulfate, at a temperature below 175° C. and a pressure of below 20 mm. of mercury.

5. The process of separating epsilon-caprolactam from admixture with polyphosphoric acid used as a Beckmann rearrangement catalyst, which comprises distilling the mixture of polyphosphoric acid and epsilon-caprolactam, without neutralization of the catalyst, at a reduced pressure and elevated temperature below 175° C. to directly distill the epsilon-caprolactam.

6. The process of separating epsilon-caprolactam from admixture with urea bisulfate used as a Beckmann rearrangement catalyst, which comprises distilling the mixture of urea bisulfate and epsilon-caprolactam, without neutralization of the catalyst, at a reduced pressure and elevated temperature below 175° C. to directly distill the epsilon-caprolactam.

7. The process of separating epsilon-caprolactam from admixture with ammonium bisulfate used as a Beckmann rearrangement catalyst, which comprises distilling the mixture of ammonium bisulfate and epsilon-caprolactam, without neutralization of the catalyst, at a reduced pressure and elevated temperature below 175° C. to directly distill the epsilon-caprolactam.

8. The process of claim 5 in which the distillation is effected at a pressure below 20 mm. of mercury.

References Cited in the file of this patent

UNITED STATES PATENTS

| 2,692,878 | Kahr | Oct. 26, 1954 |
| 2,723,266 | Lincoln et al. | Nov. 8, 1955 |
| 2,817,661 | Kampschmidt | Dec. 24, 1957 |
| 2,891,058 | Walles et al. | June 16, 1959 |
| 2,930,790 | Weise | Mar. 29, 1960 |

OTHER REFERENCES

Fieser: Organic Chemistry, pages 701–3, 3rd ed. (1956).

Noller: The Chemistry of Organic Compounds, 2nd ed., page 544 (1958).

Ser. No. 378,770, Drossbach et al. (A.P.C.), published Apr. 20, 1943.